(12) United States Patent
Bala et al.

(10) Patent No.: US 7,768,671 B2
(45) Date of Patent: Aug. 3, 2010

(54) COLOR IMAGE GAMUT ENHANCEMENT PRESERVING SPATIAL VARIATION

(75) Inventors: Raja Bala, Webster, NY (US); Michael Branciforte, Rochester, NY (US); Reiner Eschbach, Webster, NY (US)

(73) Assignee: Xerox Corporation, Norwalk, CT (US)

( * ) Notice: Subject to any disclaimer, the term of this patent is extended or adjusted under 35 U.S.C. 154(b) by 764 days.

(21) Appl. No.: 11/522,739

(22) Filed: Sep. 18, 2006

(65) Prior Publication Data

US 2008/0068626 A1 Mar. 20, 2008

(51) Int. Cl.
*H04N 1/60* (2006.01)
*G03F 3/08* (2006.01)

(52) U.S. Cl. .......................... 358/1.9; 358/518; 358/520

(58) Field of Classification Search ................. 358/518, 358/1.1, 1.2, 1.6, 1.9, 2.1, 3.01, 3.04, 3.05, 358/3.07, 3.27, 1.18, 500, 501, 516, 517, 358/519, 520, 523, 527, 530; 382/162, 163, 382/164, 165, 166, 167, 254, 260, 261, 262, 382/263, 264, 265, 274; 345/589, 590, 591, 345/597, 598, 599, 600, 603, 604, 605
See application file for complete search history.

(56) References Cited

U.S. PATENT DOCUMENTS

| 5,450,216 | A | 9/1995 | Kasson |
| 5,734,745 | A * | 3/1998 | Ohneda ....................... 382/167 |
| 6,023,527 | A * | 2/2000 | Narahara ...................... 382/167 |
| 6,373,595 | B1 * | 4/2002 | Semba et al. ................. 358/1.9 |
| 6,414,690 | B1 | 7/2002 | Balasubramanian et al. |
| 6,646,762 | B1 | 11/2003 | Balasubramanian et al. |
| 6,873,439 | B2 | 3/2005 | Levy et al. |
| 6,954,287 | B1 | 10/2005 | Balasubramanian et al. |
| 2003/0001860 | A1 * | 1/2003 | Yamazaki et al. ........... 345/590 |
| 2004/0052429 | A1 * | 3/2004 | Curry et al. ................. 382/274 |

OTHER PUBLICATIONS

Jan Morovic and Yu Wang; "A Multi-Resolution, Full-Colour Sapatial Gamut Mapping Algorithm", Hewlett Packard Company, Barcelona, Spain, IS&T/SID Eleventh Color Imaging Conference; pp. 282-287, (2003).
R. S. Gentile, E. Walowit, and J.P Allebach; "A Comparison of Techniques for Color Gamut Mismatch Compensation", SPSE/SPIE Symposium on Electronic Imaging, Los Angeles, pp. 176-181.
E.G. Pariser; "An Investigation of Color Gamut Reduction Techniques", IS&T 2nd Symposium on Electronic Publishing, pp. 105-107, 1991.

* cited by examiner

*Primary Examiner*—Dov Popovici
(74) *Attorney, Agent, or Firm*—Fay Sharpe LLP

(57) ABSTRACT

An image characterized by an original image gamut is received in an imaging device characterized by a device gamut. The original image gamut is enhanced to a first set of modified color values that occupy a greater fraction of the device gamut than the original image gamut. The modified color values of each pixel are mapped to new color values within the device gamut.

16 Claims, 3 Drawing Sheets

COLOR IMAGE GAMUT ENHANCEMENT PRESERVING SPATIAL VARIATION

CROSS REFERENCES TO RELATED PATENTS

The following patents, the disclosures of which being totally incorporated herein by reference are mentioned:

U.S. Pat. No. 6,646,762, issued Nov. 11, 2003 to Balasubramanian, entitled: "GAMUT MAPPING PRESERVING LOCAL LUMINANCE DIFFERENCES."

U.S. Pat. No. 6,954,287, issued Oct. 11, 2005 to Balasubramanian, entitled: "GAMUT MAPPING PRESERVING LOCAL LUMINANCE DIFFERENCES WITH ADAPTIVE SPATIAL FILTERING."

BACKGROUND

The present application is directed to improving the selection of printer colors. More particularly, the present application is directed to an enhancement of image gamut and will be described with the particular reference thereto. However, it is to be appreciated that the present application is applicable to other like applications.

In order to render an image on an output color device, the image colors have to be mapped to the color gamut of the output device. Gamut mapping serves to map pixels defined by colors not printable by the printer or resulting from initial image processing, into colors printable by a real printer. In doing so, out-of-gamut, unprintable colors are mapped to printable colors in accordance with some scheme designed to maintain color intent and aesthetic appearance. Traditionally, the gamut mapping has been used to reduce the color gamut of the image, e.g. complete set of colors found within an image at a given time.

In recent years, however, the gamut of the rendering devices has been substantially improved so that any given image may only use a small fraction or range of the available device colors. In this context, digitizing a photograph, converting a digitized image to a different color space, or outputting the image to a given medium using a certain output device generally alters the image gamut in the sense that some of the colors in the original image are lost in the mapping process while a large portion of the device gamut remains unused.

It would often be desirable to expand the image gamut to better utilize the printer gamut. One approach to expand the image gamut is to non-linearly distort or warp the image colors. However, such an approach is computationally complex and costly.

Another approach to expand the image gamut is to apply a generic expansion to the image gamut, e.g. increase chroma values of all pixels in the image. Because such generic chroma expansion generally leads to some color values being outside of the device gamut, one of the gamut mapping methods, such as clipping, is typically applied to bring the expanded colors within the device gamut. However, such gamut clipping is undesirable as it might destroy the spatial detail and produce objectionable artifacts in the resultant image.

There is a need for methods and apparatuses that overcome the aforementioned problems and others.

REFERENCES

U.S. Pat. No. 6,873,439, issued Mar. 29, 2005 to Levy, entitled: "VARIATIONAL MODELS FOR SPATIALLY DEPENDENT GAMUT MAPPING" describes a variational model for spatially dependent gamut mapping that includes inputting a gamut constraint, choosing a one dimensional gamut projection scheme, including selecting a transform color coordinate system, computing transform equations, and verifying gamut conditions.

U.S. Pat. No. 5,450,216, issued Sep. 12, 1995 to Kasson, entitled "COLOR IMAGE GAMUT-MAPPING SYSTEM WITH CHROMA ENHANCEMENT AT HUMAN-INSENSITIVE SPATIAL FREQUENCIES"; describes a method and system for gamut-mapping color images from device-independent form to device-dependent gamut in a Cartesian color space. Image luminance is biased toward the luminance in the device-dependent gamut at which the greatest chroma magnitude is available for a fixed hue angle.

U.S. Pat. No. 6,414,690, issued Jul. 2, 2002 to Balasubramanian et al., entitled "GAMUT MAPPING USING LOCAL AREA INFORMATION"; describes a color printing process, in which each image pixel is reviewed in context of its neighbors prior to remapping, so that a remapping function may take local area information into account in the remapping process.

However, the above references do not describe a printing system in which the image gamut is expanded to better utilize the printer gamut.

BRIEF DESCRIPTION

In accordance with one aspect, a method is disclosed. An image characterized by an original image gamut is received in an imaging device characterized by a device gamut. The original image gamut is enhanced to a first set of modified color values that occupy a greater fraction of the device gamut than the original image gamut. The modified color values of each pixel are spatially mapped to new color values within the device gamut.

In accordance with another aspect, a document printing system is disclosed. An imaging device is characterized by device gamut. A gamut device or algorithm (a) enhances original color values to occupy a greater fraction of the device gamut and (b) spatially maps the enhanced color values of each pixel to new modified color values within the device gamut.

In accordance with another aspect, a method is disclosed. An image characterized by an image gamut is received in an imaging device characterized by a device gamut. Original luminance, chroma and hue values of each pixel of the image are determined. The image gamut is enhanced to better utilize the device gamut including: (a) expanding the original chroma values of each pixel, and (b) spatially mapping at least the original luminance value of each pixel to a new luminance value.

DETAILED DESCRIPTION

In the following, the term "luminance" is used generically to encompass the strict definitions of luminance (i.e., the Y component in XYZ) and its perceptual correlation to lightness (i.e. the L* component in L*a*b*) as well as other definitions that could serve to describe the "black & white" or grayscale component of a color image. Terms "chrominance components" (C1 and C2) refer to generic manifestations of opponent color signals. Another attribute that is referred to is "colorfulness". The colorfulness can be derived from the chrominance components C1, C2, and is indicative of a deviation from a corresponding gray or neutral color. Chroma and saturation are examples of the colorfulness attribute.

Figure 1:
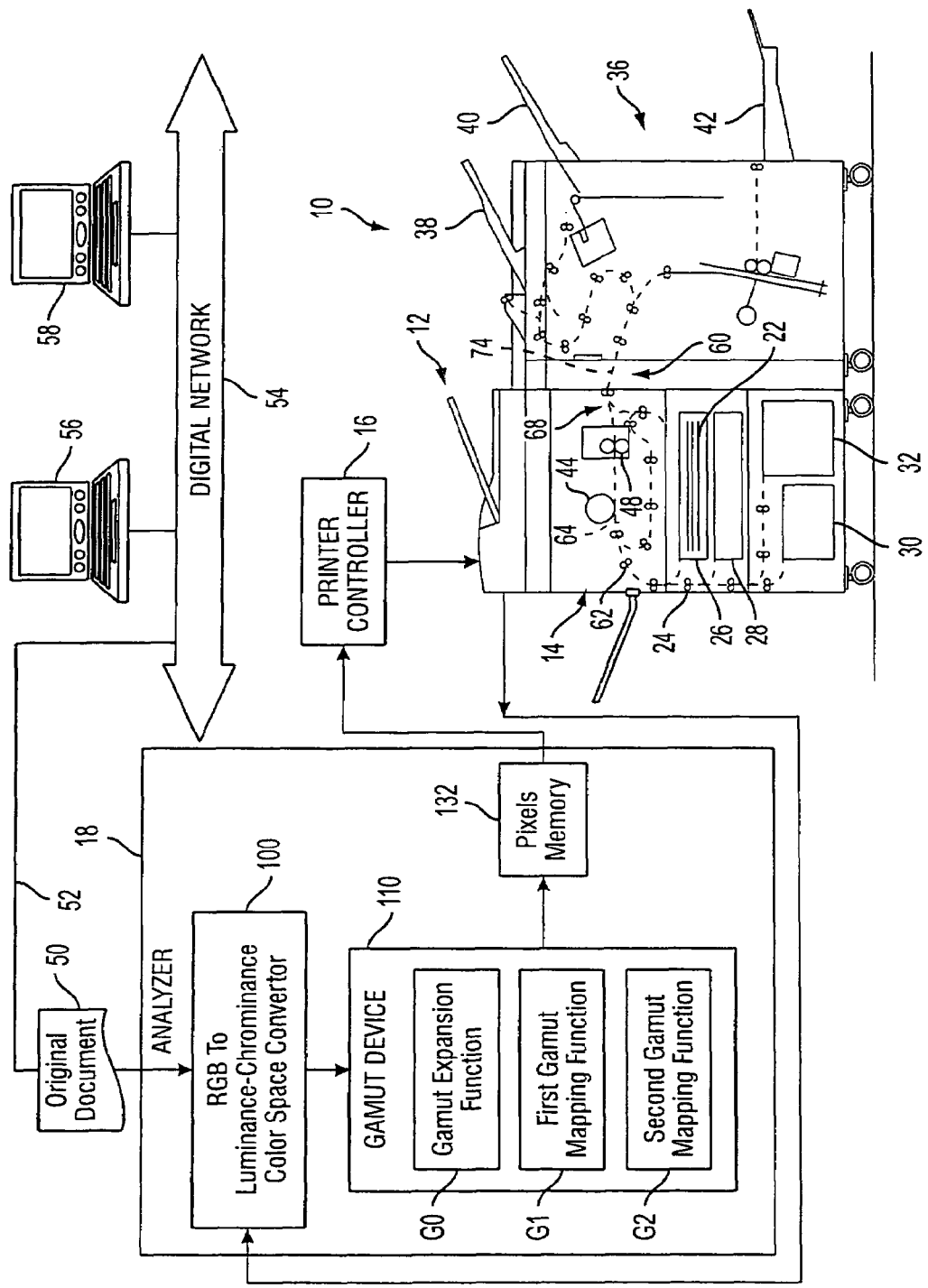
FIG. 1 is a diagrammatic illustration of an imaging system.

With reference to FIG. 1, a printing or document processing system 10 includes an image input device 12 such as a scanner, a printer such as a printing or marking engine or printer 14, and a printer or system controller 16, all interconnected by links. The links can be wired or wireless links or other means capable of supplying electronic data to and/or from the connected elements. Exemplary links include telephone lines, computer cables, ISDN lines, and the like. Thus, the printing system 10 can be a monolithic system, as in some multifunction devices, or a distributed system where the component connection can be remote, asynchronous and dynamic. The image input device 12 may include conversion electronics for converting the image-bearing documents to image signals or pixels or such function may be assumed by the marking engine 14. For example, the image input device 12 is used to scan an original document to form red-green-blue (RGB) values. The RGB color space is converted to a luminance-chrominance color space such as CIE color space L*a*b*. The three parameters represent the lightness of the color, L* (L*=0 yields black and L*=100 indicates white), its position between magenta and green, a* (negative values indicate green while positive values indicate magenta) and its position between yellow and blue, b* (negative values indicate blue and positive values indicate yellow). It is contemplated that the RGB color space can be converted to some other luminance-chrominance color space defined by parameters L, C1, C2. As described in detail below, an analyzer, analyzing processor, mechanism, algorithm or other means 18 analyzes image colors and applies the corrective functions which enhance the image colorfulness. For example, the corrective functions amplify the chroma of each pixel and then perform the spatial mapping so that the image colors utilize the printer gamut to a greater extent while spatial variations are preserved. In one embodiment, the corrective functions are applied to one of other components of the colorfulness attribute. In one embodiment, the color space conversion is a component in, for example, a compression system. A luminance chrominance space is an exemplary space. Other color spaces can easily be converted among each other. Equivalent transforms exist for the different color spaces which require different complexity of implementation.

With continuing reference to FIG. 1, the marking engine 14 is fed with a print media or sheet or sheets 22 from a respective print media feeding source 24 such as a paper feeder including one or more print media sources or paper trays 26, 28, 30, 32. Each of the print media sources 26, 28, 30, 32 can store sheets of the same type of print media, or can store different types of print media. For example, the print media sources 26, 28 may store the same type of large-size paper sheets, print media source 32 may store company letterhead paper, and the print media source 30 may store letter-size paper. The print media can be substantially any type of media upon which the marking engine 14 can print, such as: high quality bond paper, lower quality "copy" paper, overhead transparency sheets, high gloss paper, and so forth. Printed media from the marking engine 14 is delivered to a finisher 36 including one or more finishing output destinations 38, 40, 42 such as trays, stackers, pans, etc. The marking engine 14 includes an imaging component 44 and an associated fuser 48.

In one embodiment, the printing system 10 is a xerographic printing system in which the marking engine 14 includes a photoconductive insulating member which is charged to a uniform potential and exposed to a light image of an original document to be reproduced. The exposure discharges the photoconductive insulating surface in exposed or background areas and creates an electrostatic latent image on the member, which corresponds to the image areas contained within the document. Subsequently, the electrostatic latent image on the photoconductive insulating surface is made visible by developing the image with an imaging material such as a developing powder comprising toner particles. The toner image may subsequently be transferred to the print media, to which the toner image is permanently affixed in the fusing process. In a multicolor electrophotographic process, successive latent images corresponding to different colors are formed on the insulating member and developed with a respective toner of a complementary color. Each single color toner image is successively transferred to the paper sheet in superimposed registration with the prior toner image to create a multi-layered toner image on the paper. The superimposed images may be fused contemporaneously, in a single fusing process. It will be appreciated that other suitable processes for applying an image may be employed.

The fuser 48 receives the imaged print media from the image-forming component and fixes the toner image transferred to the surface of the print media substrate. The fuser 48 employed in the printer 14 can be of any suitable type, and may include fusers which apply heat or both heat and pressure to an image. For example, the fuser may apply one or more of heat or other forms of electromagnetic radiation, pressure, electrostatic charges, and sound waves, to form a copy or print. One suitable fuser includes a pair of rotating rollers spaced to define a nip through which the print media is fed. One of the rollers is heated, while the other roller may serve simply as a means of applying pressure. Other fusing members are also contemplated in place of a pair of rollers, such as belts, sleeves, drumbelts, and the like. Other suitable fusers which may be employed include radiant fusers, which apply a high-intensity flash lamp to the toner and paper.

The printing system 10 executes print jobs. Print job execution involves printing selected text, line graphics, images, machine ink character recognition (MICR) notation, or so forth on front, back, or front and back sides or pages of one or more sheets of paper or other print media. In general, some sheets may be left completely blank. While the illustrated embodiment shows one marking engine 14, it will be appreciated that the printing system 10 may include more than one marking engine, such as two, three, four, six, or eight marking engines. The marking engines may be electrophotographic printers, ink-jet printers, including solid ink printers, and other devices capable of marking an image on a substrate. The marking engines can be of the same print modality (e.g., process color (P), custom color (C), black (K), or magnetic ink character recognition (MICR)) or of different print modalities.

An original document or image or print job or jobs 50 can be supplied to the printing system 10 in various ways. The built-in optical scanner 12 can be used to scan a document such as book pages, a stack of printed pages, or so forth, to create a digital image of the scanned document that is reproduced by printing operations performed by the printing system 10.

Alternatively, the print jobs 50 can be electronically delivered to the printing system 10 via a wired connection 52 from a digital network 54 that interconnects example computers 56, 58 or other digital devices. For example, a network user operating word processing software running on the computer 58 may select to print the word processing document on the printing system 10, thus generating the print job 50, or an external scanner (not shown) connected to the network 54 may provide the print job 50 in electronic form. While the wired network connection 52 is illustrated, a wireless network connection or other wireless communication pathway may be used instead or additionally to connect the printing system 10 with the digital network 54. The digital network 54 can be a local area network such as a wired Ethernet, a wireless local area network (WLAN), the Internet, some combination thereof, or so forth. Moreover, it is contemplated to deliver the print jobs 50 to the printing system 10 in other ways, such as by using an optical disk reader (not illustrated) built into the printing system 10, or using a dedicated computer connected only to the printing system 10.

A print media transporting system, network or highway 60 links the print media source 24, printer 14 and finisher 36. The print media transporting system 60 includes a network of flexible paper pathways that feeds to and collects from each of the printers. The print media transporting system 60 may comprise drive members, such as pairs of rollers 62, spherical nips, air jets, or the like. The system 60 may further include associated motors for the drive members, belts, guide rods, frames, etc. (not shown), which, in combination with the drive members, serve to convey the print media along selected pathways at selected speeds. In the illustrated embodiment, the print media from the source 24 is delivered to the printer 14 by a pathway 64 which is common to the trays 26, 28, 30, 32. The print media is printed by the imaging component 44 and fused by the fuser 48. A pathway 68 from the printer 14 merges into a pathway 74 which conveys the printed media to the finisher 36.

The pathways 64, 68, 74 of the network 60 may include inverters, reverters, interposers, bypass pathways, and the like as known in the art. It will be appreciated that the printer 14 may be configured for duplex or simplex printing and that a single sheet of paper may be marked by two or more of the printers or marked a plurality of times by the same printer, for example, by providing internal duplex pathways.

In one embodiment, the document processing system 10 is a network scanning engine. More specifically, the input documents are scanned in by the scanner 12, processed by the analyzer or processor 18, and exported over to some file repository or user's electronic mail (e-mail) via the digital network 54.

Figure 2:
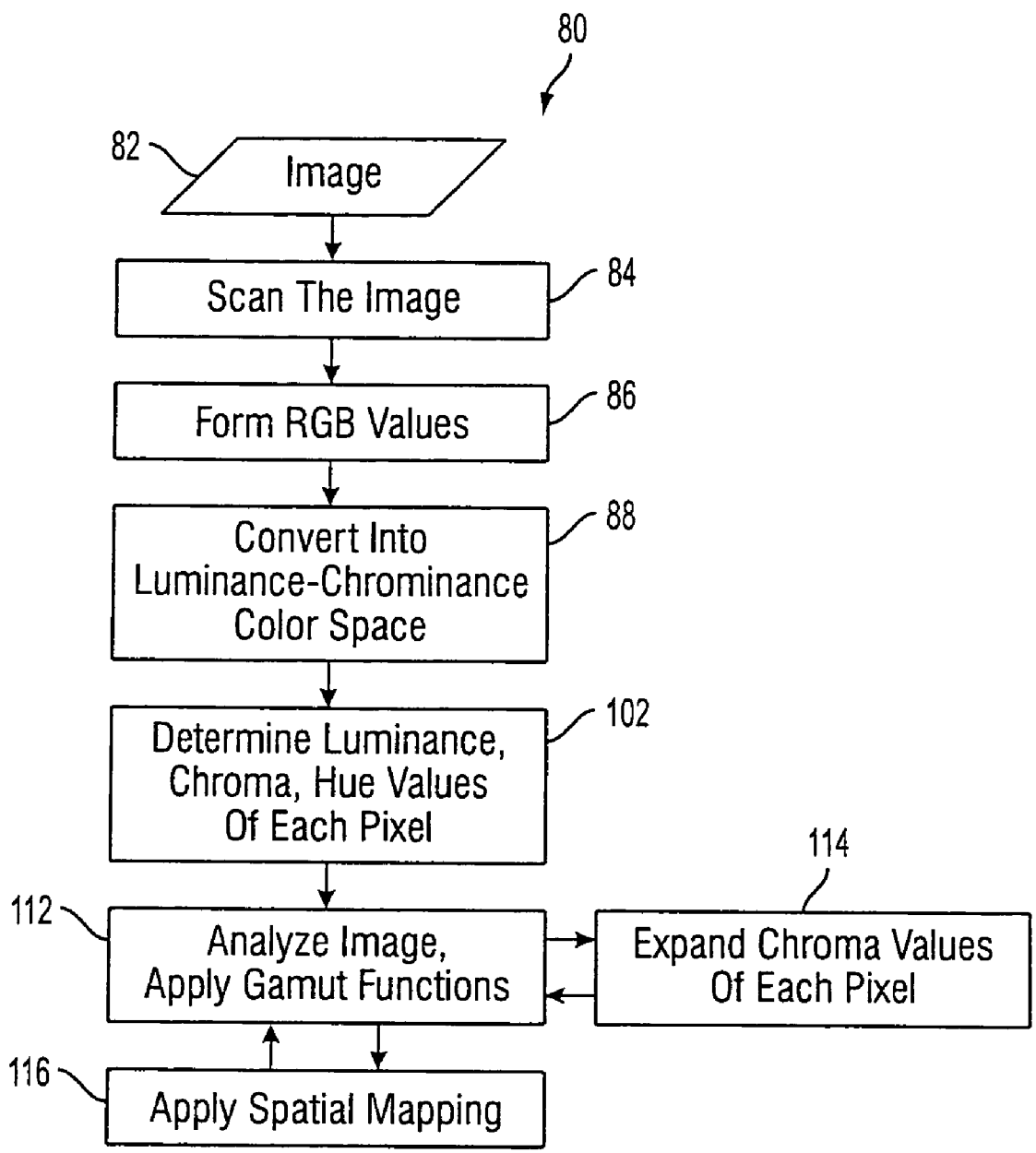
FIG. 2 is a flow diagram of a control method which improves the selection of printer colors.

With continuing reference to FIG. 1 and further reference to FIG. 2, a control methodology approach 80 controls image gamut expansion in the document processing system 10. An image 82 is received by the document processing system 10. For example, the image 82 is scanned 84 by the scanner 12 to generate a digital representation of the scanned sheet, e.g. to form RGB values 86. The RGB values of pixels are converted 88 to a CIE color space L*, a*, b* or some other luminance-chrominance color space Y, C1, C2 (luminance, chroma, hue) by an RGB to luminance-chrominance color space converter 100. Luminance, chroma and hue Y, C1, C2 of each pixel are determined 102. Of course, it is contemplated that the chroma may be computed and adjusted by directly operating on a* and b* values.

A gamut or gamut-mapping device, algorithm, mechanism or other means 110 analyzes 112 the image and applies gamut functions as described below to each pixel. The gamut device 110 serves to make the images more colorful and map pixels defined by colors not printable by the printer 14, or resulting from prior image processing, into colors printable by the printer 14, e.g. within the printer color gamut. In doing so, out-of-gamut, unprintable colors are mapped to printable colors in accordance with some scheme that optimizes retention of the spatial relationships of colors within the document. Colors that fall within the output gamut may also be adjusted to retain the spatial relationships to the mapped colors.

Figure 3:
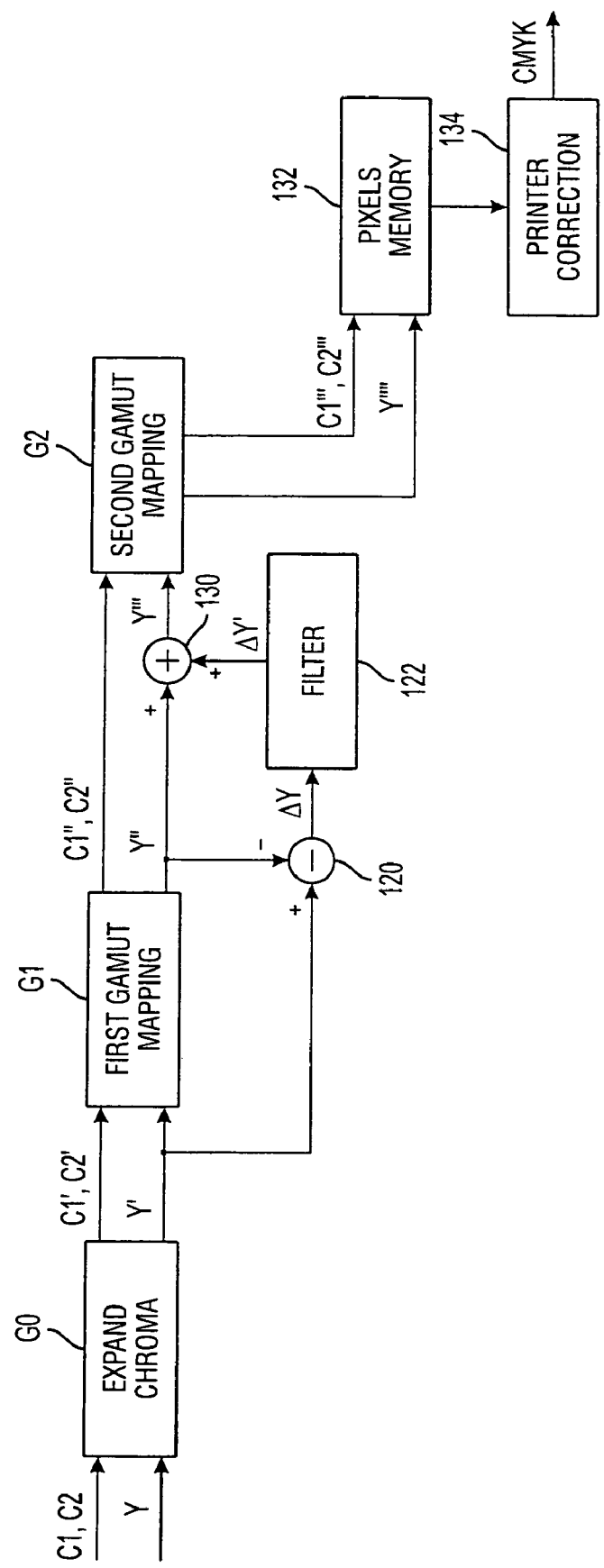
FIG. 3 is a diagrammatic illustration of a detail of the control process which improves the selection of printer colors.

With continuing reference to FIGS. 1 and 2 and further reference to FIG. 3, more specifically, a gamut expansion function G0 is applied to each pixel. For example, the gamut expansion function G0 amplifies or expands 114 the chroma value C1 of each pixel so that the image colors occupy a greater fraction of the color gamut of the printing device 14. For example, the chroma value C1 of each pixel is multiplied by a predetermined gain factor. The output of the gamut expansion function G0 is a first set of modified values represented by parameters Y', C1', C2'.

The gamut device 110 analyzes the colors defined by the parameters Y', C1', C2' and applies 116 spatial mapping. More specifically, a first gamut mapping function G1 is applied to each pixel. For example, the first gamut mapping function G1 is an optimized non-linear function, a simplistic mapping function, where out of gamut pixels are moved to the nearest "in gamut" plane, and the like appropriate gamut mapping function such as described in R. S. Gentile, E. Walowit, and J. P. Allebach, "A Comparison of Techniques for Color Gamut Mismatch Compensation," SPSE/SPIE Symposium on Electronic Imaging, Los Angeles, pp. 176-181; and E. G. Pariser, "An Investigation of Color Gamut Reduction Techniques," IS&T 2nd Symposium on Electronic Publishing, pp. 105-107, 1991.

The output from the first gamut function mapping G1 is a second set of modified color signals defined by parameters Y", C1", C2". A comparator 120 compares the second modified output luminance value Y" to input luminance value Y' of the first modified values set. An example of the comparator 120 is a simple differencing function which produces a luminance difference output $\Delta Y$ indicative of a difference between input and output luminance values Y', Y". In one embodiment, the other color channels are also included in the differencing operation. A filter 122 operating on an n×m block of values of the luminance difference output $\Delta Y$ is used so that the feed forward to a second gamut mapping function G2 is based on a local area, rather than derived on a pixel by pixel basis. In one embodiment, the filter 122 is a linear high pass filter. E.g., at low frequencies, the filter output $\Delta Y'$ is equal to 0, while at high frequencies, the filter output $\Delta Y'$ is equal to the input luminance value Y'. Because the high pass filter 122 operates on the difference image, rather than on the original image, only the detail that is lost in the prior image processing is restored or enhanced.

In another embodiment, the filter 122 is an adaptive filter. For example, the filter 122 can adapt to change the filter footprint and coefficients as a function of the local image data. Such filter is advantageous for images containing a combination of pictorial scenes, graphics and text. Alternatively, the filter 122 is a non-linear filter.

The output $\Delta Y'$ of spatial filter 122 is used to vary the first gamut mapping function luminance output value Y" to obtain an adjusted luminance value Y'''. For example, the filter output $\Delta Y'$ is added to the first gamut mapping function output Y" at an adder 130. When the high filter is used, the gamut mapping process approximately reproduces the variations in the input luminance values Y at high spatial frequencies, while reducing to the pixelwise mapping effect of the first gamut mapping function G1 at low spatial frequencies.

The gamut device 110 analyzes the colors defined by parameters Y''', C1", C2" and applies the second gamut mapping function G2 which may or may not be the same function as the first gamut mapping function G1. The resulting color values Y"", C1''', C2''' of the pixels are stored in a pixel memory 132. The printer controller 16 receives the color values Y"", C1''', C2''' and applies a printer correction function 134, for conversion to device dependent signals preparatory to printing.

In general, the design of the functions G0, G1 and G2, and the spatial filter 122 depends on many factors, including global and local image characteristics, device characteristics, rendering intent and user preference.

In the manner described above, the image gamut is expanded to occupy a larger range of the device gamut. The chroma of the image is amplified, while the spatial gamut mapping process G1, G2 is performed on the expanded gamut to bring the expanded image gamut within the device gamut.

The luminance variations of the original image are preserved at high special frequency by the second gamut mapping function G2, thus minimizing luminance error.

It will be appreciated that various of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

The invention claimed is:

1. A method for controlling image gamut expansion in a document processing system including at least one processor, comprising:
   converting RGB values of a received document to a luminance-chrominance color space defined by a first set of Y,C1,C2 parameter values for each pixel in an original image of the received document, the first set of Y,C1,C2 parameter values including an original luminance value Y, an original chroma value C1, and an original hue value C2;
   applying a gamut expansion function to occupy a greater fraction of a device gamut, including:
      applying the gamut expansion function to the first set of Y,C1,C2 parameter values to obtain modified Y',C1', C2' values for a modified image including a first modified luminance value Y', a first modified chroma value C1', and a first modified hue value C2';
   applying a first gamut mapping G1 to the modified image, including:
      obtaining a second set of modified Y",C1",C2" values by moving out-of-gamut pixels of the modified image to a nearest gamut plane, the second set of modified Y",C1",C2" values including a second modified luminance value Y", a second modified chroma value C1", and a second modified hue value C2";
      applying a standard pixel-wise gamut mapping to the modified image;
      obtaining a luminance difference output ΔY by comparing the first modified luminance value Y' to the second modified luminance values Y";
   filtering the luminance difference output ΔY of the modified image to obtain a filtered output ΔY';
      obtaining an adjusted luminance value Y'" by adding the filtered output ΔY" to the first modified luminance value Y'; and,
   applying a second gamut function G2 to obtain a third set of modified values Y"",C1'",C2'".

2. The method of claim 1, wherein the filtering is performed by a linear high pass filter.

3. The method of claim 2, wherein the filtered output ΔY' is a value within a range between 0 and the first modified luminance value Y'.

4. The method of claim 1, wherein the filtering is performed by an adaptive filter.

5. The method of claim 1, further including storing the third set of modified values Y"",C1'",C2'" in a memory.

6. The method of claim 1, wherein the gamut expansion function includes multiplying the original chroma value C1 for each pixel to a predetermined factor.

7. The method of claim 6, wherein the predetermined factor is a value that amplifies the original chroma value C1 so that colors of the modified image occupy the greater fraction of the device gamut.

8. The method of claim 1, further including obtaining a chroma difference value ΔC1 by applying a differing function to the second modified chroma value C1" and the first modified choma value C1'.

9. The method of claim 1, further including obtaining a hue difference value ΔC2 by applying a differing function to the second modified hue value C2" and the first modified hue value C2'.

10. A method to expand an image gamut in a document processing machine including at least one processor, comprising:
    converting RGB values of a received document to a luminance-chrominance color space defined by a first set of Y,C1,C2 parameter values for each pixel in an original image of the received document, the first set of Y,C1,C2 parameter values including an original luminance value Y, an original chroma value C1, and an original hue value C2;
    multiplying the original chroma value C1 of each pixel by a predetermined factor to obtain a first set of modified parameter values Y',C1',C2' for a modified image, each pixel of the modified image including a first modified luminance value Y', a first modified chroma value C1', and a first modified hue value C2';
    obtaining a second set of modified Y",C1",C2" values by moving out-of-gamut pixels of the modified image to a nearest gamut plane, the second set of modified Y",C1", C2" values including a second modified luminance value Y", a second modified chroma value C1", and a second modified hue value C2";
    applying a standard pixel-wise gamut-mapping to the modified image;
    obtaining a luminance difference output ΔY by comparing the first modified luminance value Y' to the second modified luminance values Y";
    filtering the luminance difference output ΔY of the modified image to obtain a filtered output ΔY'; and,
    obtaining an adjusted luminance value Y'" by adding the filtered output ΔY' to the first modified luminance value Y'.

11. The method of claim 10, further including applying a second gamut function G2 to obtain a third set of modified values Y"",C1'",C2'".

12. The method of claim 11, further including storing the third set of modified values Y"",C1'",C2'" in a memory.

13. The method of claim 10, wherein the filtering is performed by a linear high pass filter.

14. The method of claim 10, wherein the filtered output ΔY' is a value within the range 0 and the first modified luminance value Y'.

15. The method of claim 10 wherein the filtering is performed by an adaptive filter.

16. The method of claim 10, wherein the predetermined factor is a value that amplifies the original chroma value C1 so that colors of the modified image occupy a greater fraction of a device gamut.

* * * * *